United States Patent
Hewitt

(10) Patent No.: US 9,022,822 B2
(45) Date of Patent: May 5, 2015

(54) AMPHIBIOUS VEHICLE ELECTRIC DRIVE SYSTEM

(71) Applicant: Stanley C Hewitt, Ketchikan, AK (US)

(72) Inventor: Stanley C Hewitt, Ketchikan, AK (US)

( * ) Notice: Subject to any disclaimer, the term of this patent is extended or adjusted under 35 U.S.C. 154(b) by 0 days.

(21) Appl. No.: 14/328,114

(22) Filed: Jul. 10, 2014

(65) Prior Publication Data

US 2015/0004854 A1     Jan. 1, 2015

Related U.S. Application Data

(63) Continuation-in-part of application No. 13/932,483, filed on Jul. 1, 2013, now Pat. No. 8,808,042.

(51) Int. Cl.

| | | |
|---|---|---|
| *B60F 3/00* | (2006.01) | |
| *B63H 11/00* | (2006.01) | |
| *B63H 21/14* | (2006.01) | |
| *B63H 21/17* | (2006.01) | |
| *B63H 21/20* | (2006.01) | |
| *B60K 1/02* | (2006.01) | |
| *B60L 11/02* | (2006.01) | |
| *B63H 11/04* | (2006.01) | |
| *B60K 1/00* | (2006.01) | |
| *B60K 7/00* | (2006.01) | |

(52) U.S. Cl.
CPC .............. *B60F 3/0015* (2013.01); *B63H 11/00* (2013.01); *B60F 2301/12* (2013.01); *B60F 3/0007* (2013.01); *B63H 11/04* (2013.01); *B63H 21/14* (2013.01); *B63H 21/17* (2013.01); *B63H 21/20* (2013.01); *B60K 1/00* (2013.01); *B60K 1/02* (2013.01); *B60L 11/02* (2013.01); *B60K 7/0007* (2013.01)

(58) Field of Classification Search
CPC ........ B60F 3/00; B60F 3/0007; B60F 3/0015; B60F 3/0069; B60F 2301/12; B63H 11/00; B63H 11/02; B63H 11/04; B63H 11/08; B63H 2011/008; B63H 21/14; B63H 21/17; B63H 21/20; B63H 23/18–23/24; B60K 1/00; B60K 1/02; B60K 2001/001; B60K 7/0007; B60K 2025/005; B60L 11/02; B60L 11/14; B60L 2200/32
USPC ................................ 440/5, 6, 12.5–12.64, 38
See application file for complete search history.

(56) References Cited

U.S. PATENT DOCUMENTS

| | | | | |
|---|---|---|---|---|
| 3,420,204 | A * | 1/1969 | Samuel ..................... | 440/12.56 |
| 3,487,802 | A * | 1/1970 | Roy ........................... | 440/12.54 |
| 4,102,292 | A * | 7/1978 | Hunter et al. .............. | 440/12.63 |
| 5,181,478 | A * | 1/1993 | Berardi ...................... | 440/12.54 |
| 6,921,304 | B2 | 7/2005 | Hewitt | |
| 7,950,973 | B2 | 5/2011 | Hewitt | |
| 8,808,042 | B1 * | 8/2014 | Hewitt ....................... | 440/12.51 |

\* cited by examiner

*Primary Examiner* — Ajay Vasudeva
(74) *Attorney, Agent, or Firm* — William M. Hobby, III

(57) ABSTRACT

This invention relates to an amphibious vehicle and especially to an amphibious vehicle having twin internal combustion engines propelling the vehicle in water with a pair of water jet drives and propelling the vehicle on land with one of the same engines having an electric generator powering a pair of electric motors each coupled to a track assembly. Each electric motor and each air brakes are controlled separately to steer and brake the track assemblies.

14 Claims, 4 Drawing Sheets

AMPHIBIOUS VEHICLE ELECTRIC DRIVE SYSTEM

This application is a continuation-in-part of my prior U.S. patent application Ser. No. 13/932,483, filed Jul. 1, 2013, now U.S. Pat. No. 8,808,042, for Amphibious Vehicle Drive System.

FIELD OF THE INVENTION

This invention is related to an amphibious vehicle and especially to an amphibious vehicle having twin internal combustion engines propelling the vehicle in water with a pair of water jet drives and propelling and steering the vehicle on land with a pair of electric motor powered track assemblies. One of the pair of internal combustion engines drives a generator to power both electric motors.

BACKGROUND OF THE INVENTION

An amphibious vehicle is a motorized vehicle capable of travel on land as well as in the water. Such vehicles are known and are capable of providing transportation either in water or on land and are useful in areas where there are bodies of water, such as lakes, rivers, swamps, and the like, which need to be traversed. The amphibious vehicle allows its operator to travel across land and upon reaching the edge of a body of water, proceed into the water and continue on.

Many amphibious vehicles use a drive assembly, typically an assembly of wheels or caterpillar tracks that are fixed in position and cannot be retracted from the water during marine operation. The inability to remove the driving assembly from the water when the vehicle is traveling in the water means the amphibious vehicle cannot be operated at a high speed in the water because of the high drag caused by the submerged driving assembly. Maneuverability in the water is also compromised by the additional drag.

In my prior U.S. Pat. No. 7,950,973 for an Amphibious Vehicle, I show an improved amphibious vehicle which allows the track assemblies to be rotated between a lower position supporting the amphibious vehicle on land while providing propulsion to the vehicle on land and a raised position where the tracks rest vertically above the hull's deck during marine operation. With the caterpillar track assemblies fully removed from the water, the vehicle's performance and maneuverability are improved. The track assemblies are hydraulically driven to rotate the wheels and tracks between a lowered and a raised position. The present application is an improved drive system for the vehicle in this prior U.S. patent and the contents of this earlier patent is incorporated herein by reference in its entirety.

In my prior U.S. Pat. No. 6,921,304 for an Amphibious Vehicle, I show an earlier improved amphibious vehicle which allows the track assemblies to be rotated between raised and lowered positions. In this prior patent the tracks are raised and lowered by a lifting mechanism which lifts the tracks and then pulls the tracks inward toward the hull of the vehicle using hydraulic rams. The lifting and pulling lifts the tracks into a fully upright position onto the hull to reduce the overall width of the amphibious vehicle to facilitate trailering.

In my prior U.S. patent application Ser. No. 13/932,483 for an Amphibious Vehicle Drive System, I show an improved amphibious vehicle drive system having twin internal combustion engines propelling the vehicle in the water with a pair of jet drives and propelling the vehicle on land with one of the same engines having an automatic transmission controlling a pair of track assemblies with a pair of planetary gears, clutches and disc brakes.

The present invention is for an improved drive system for the amphibious vehicle as shown in my prior U.S. patent application and propels the vehicle in the water with a pair of water jet drives and propels the vehicle on land with a pair of track assemblies with a pair of electric motors while using one of the engines to drive a generator to power both electric motors, so that the same engines power for the vehicle on both land and on water. The electric motors can be controlled by controlling the input to each motor separately electrically to steer and drive the vehicle.

SUMMARY OF THE INVENTION

This invention relates to an amphibious vehicle and amphibious vehicle drive system having a vehicle hull with a pair of track drive assemblies and a pair of water jet drives. A pair of internal combustion engines are mounted in the vehicle hull, each having an output shaft. A marine transmission couples each internal combustion engine output shaft to one of the water jet drives. An amphibious vehicle drive system is thus powered by a pair of internal combustion engines driving a pair of water jet drives in the water and driving the vehicle on land with a pair of electric motors driving a pair of track assemblies which electric motors are powered by a generator on one of the internal combustion engines.

The amphibious vehicle has a vehicle hull having a pair of track drive assemblies, each of which is movable between a raised resting position when the vehicle is being operated in water and has a lowered operative position when the vehicle is being operated on land with the tracks. Two internal combustion diesel engines are mounted in the hull and each one is coupled to a marine transmission driving a water jet drive attached to the hull for propelling the vehicle through water. The vehicle is driven on land with the pair of tracks in a lower land operating position by a pair of electric motors, one electric motor being coupled to each track assembly for driving the coupled track assembly. Each electric motor is powered by an electric generator on one of to engines which generates power for both electric motors to drive the vehicle tracks when the tracks are in the lowered land operating position for driving on land. A air disk brake is coupled to each track assembly for selectively braking the track assembly. An electric motor control remotely controls each electric motor to selectively drive each track assembly for driving the vehicle on land and also for steering and braking the vehicle by selectively controlling each track assembly separately. Thus an amphibious vehicle is propelled in water by a water jet drive powered by an internal combustion engine and propelled on land by a pair of electric motors driving a pair of track assemblies powered by an internal combustion engine driven electric generator which also drives an air compressor to provide compressed air for the air brakes for each track assembly and which allows for braking and steering the vehicle.

BRIEF DESCRIPTION OF THE DRAWINGS

The accompanying drawings, which are included to provide further understanding of the invention are incorporated in and constitute a part of the specification, and illustrate an embodiment of the invention and together with the description serve to explain the principles of the invention.

In the drawings.

DETAILED DESCRIPTION OF EXEMPLARY EMBODIMENT

Figure 1:
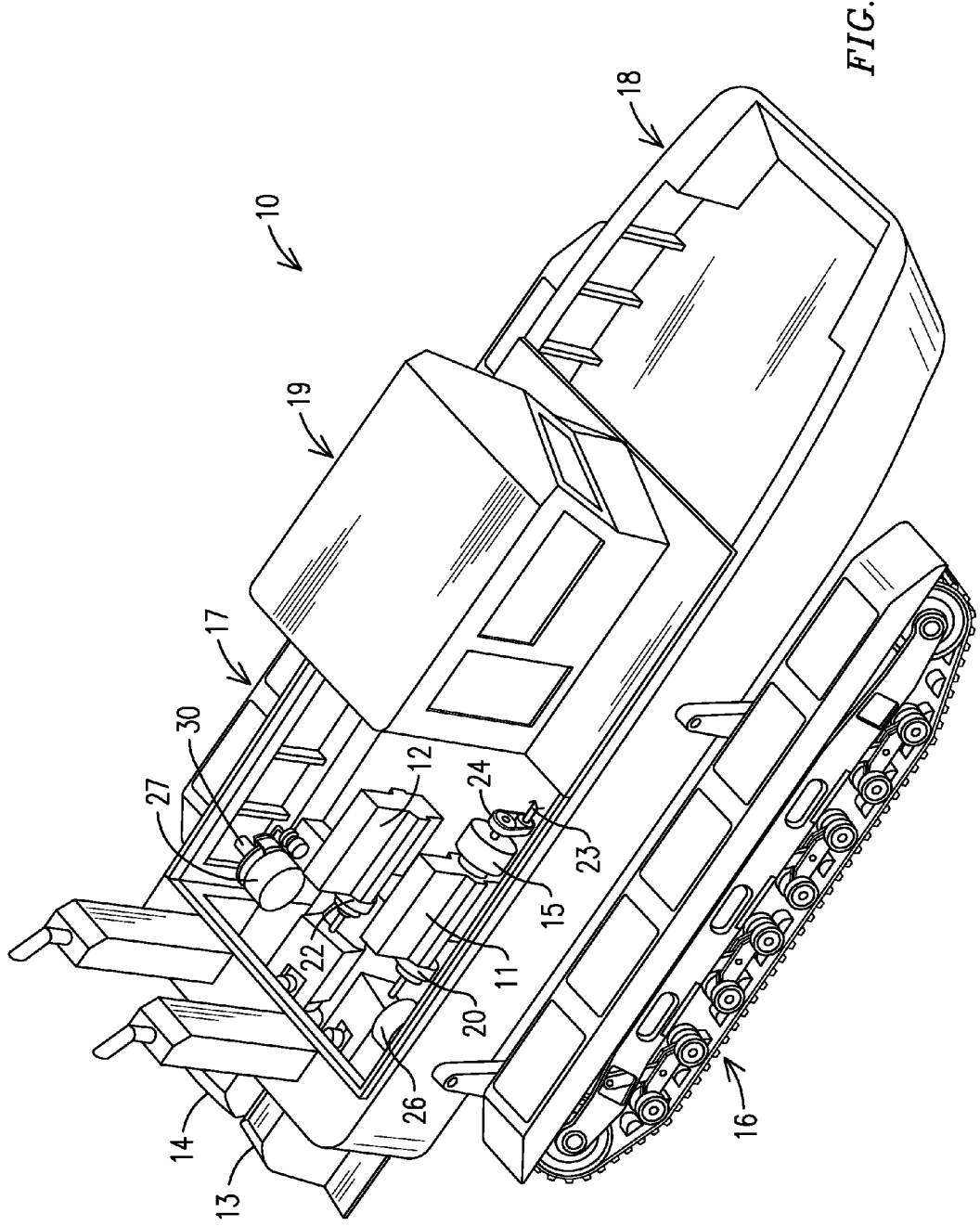
FIG. 1 is a perspective view of an amphibious vehicle having a drive train in accordance with the present invention.
Figure 2:
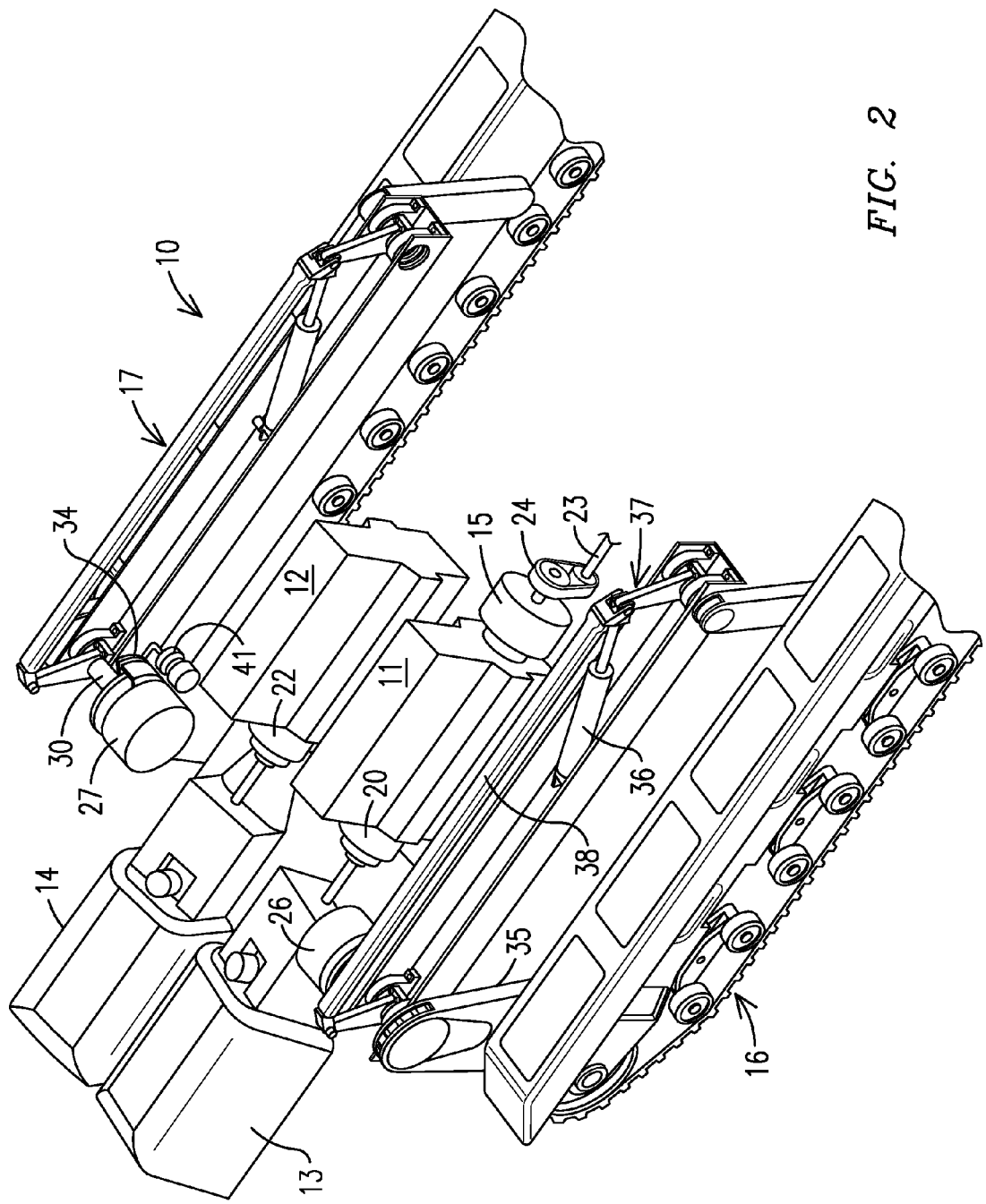
FIG. 2 is a partial perspective view of the amphibious vehicle of FIG. 1.
Figure 3:
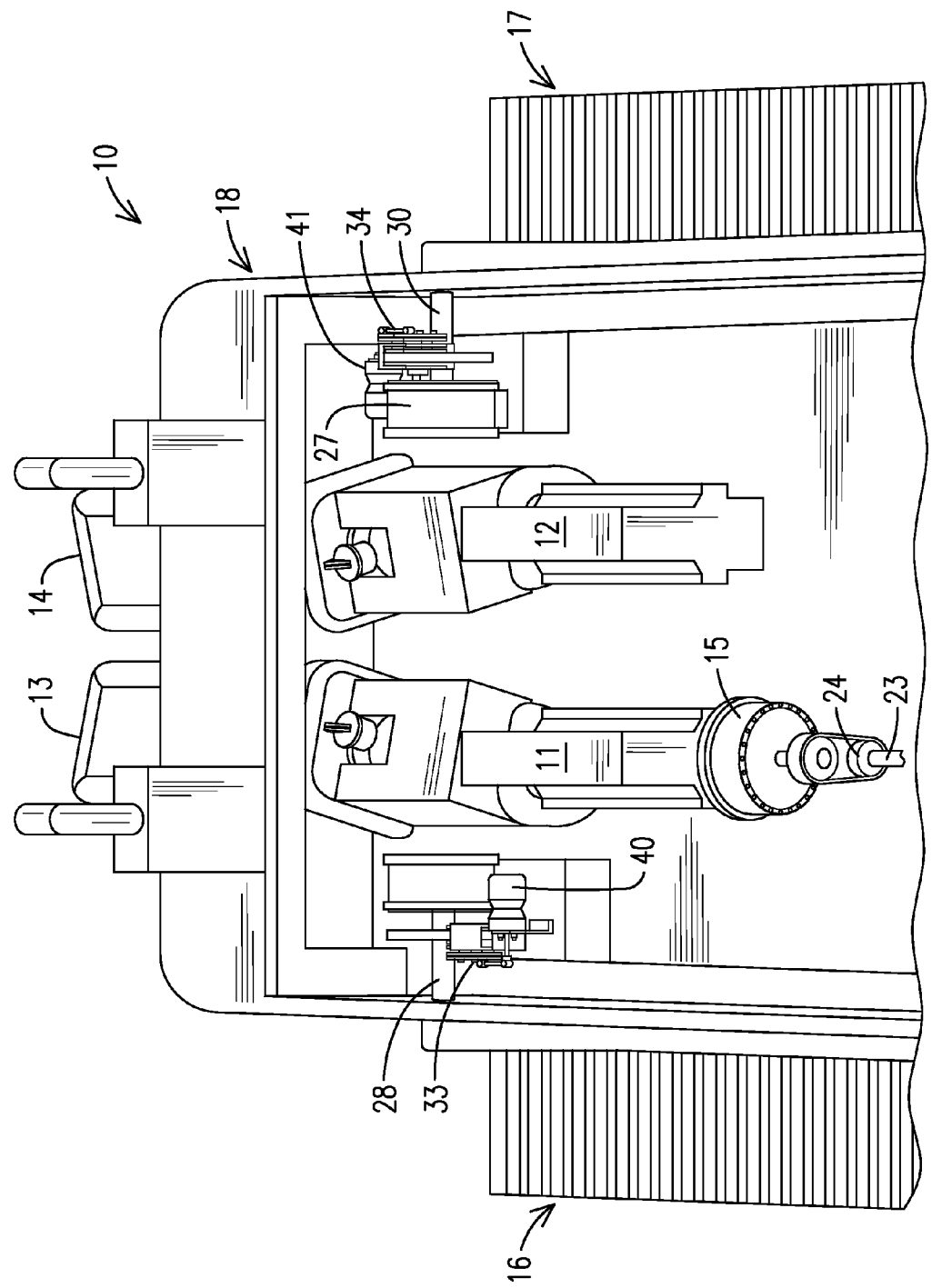
FIG. 3 is partial top plan view of the amphibious vehicle of FIGS. 1 and 2.

As seen in FIGS. 1-3 of the drawings, this invention is related to an amphibious vehicle 10 and especially to an amphibious vehicle having twin internal combustion engines 11 and 12, such as two 300 hp diesel engines, propelling the vehicle in water with a pair of water jet drives 13 and 14 and propelling the vehicle 10 on land with one of the same engines powering an electric generator 15 controlling a pair of track assemblies 16 and 17.

In FIGS. 1 to 3, the amphibious vehicle 10 has a hull 18, such as a 32 foot long hull, having a cabin 19 thereon and has track drive assemblies 16 and 17 mounted on either side of the hull 18. The track assemblies 16 and 17 are arranged so that the tracks can be rotated between a lower land propelling position as shown in FIGS. 1 and 2 and a raised rest position when the vehicle is being propelled in water. The tracks are above the water level during marine operations in accordance with my prior U.S. patents.

The drive system of the present invention, as more clearly seen in connection with FIGS. 1-3, has a pair of diesel engines 11 and 12 powering a pair of water jet drives 13 and 14. Engine 11 has an electric generator 15 coupled to the output of the engine. Each marine transmission 20 and 22 is coupled to one of the water jet drives 13 and 14. Engine 11 has a marine transmission 20 coupled to the water jet drive 13 while engine 12 has a marine transmission 22 coupled to water jet drive 14. The water jet drives 13 and 14 propel the amphibious vehicle 10 when traveling in water with the track assemblies 16 and 17 in a raised position. Amphibious vehicle engine 11 has an electric generator 15 and an air compressor 23 operatively coupled thereto. A belt drive 24 drives the air compressor from the engine 11 output shaft. The electric generator 15 may be a 340 kw electric generator which powers two electric motors 26 and 27. Each electric motor may be a 130 kw dc electric motor used to power the tracks 16 and 17. Each engine 11 and 12 may be a 500 hp diesel engine.

The electric motor 26 is coupled to track assembly 16 drive shaft 28 while electric motor 27 is coupled to track assembly 17 drive shaft 30. Each electric motor 26 and 27 can drive its respective track assembly in a forward or reverse direction and each motor can independent of the other motor vary its speed to vary the speed of its coupled track. By selectively varying the speed of one track relative to the other, the vehicle can be steered on land by the control of the electric motors. The steering of a track vehicle is conventionally done by braking one or the other of the track assemblies, forcing the non-braked track assembly to turn the vehicle. To accomplish this with electric motors does not require that the track assembly being braked also be clutched at the same time. The electric motors 26 and 27 are also used in braking the vehicle.

Figure 4:
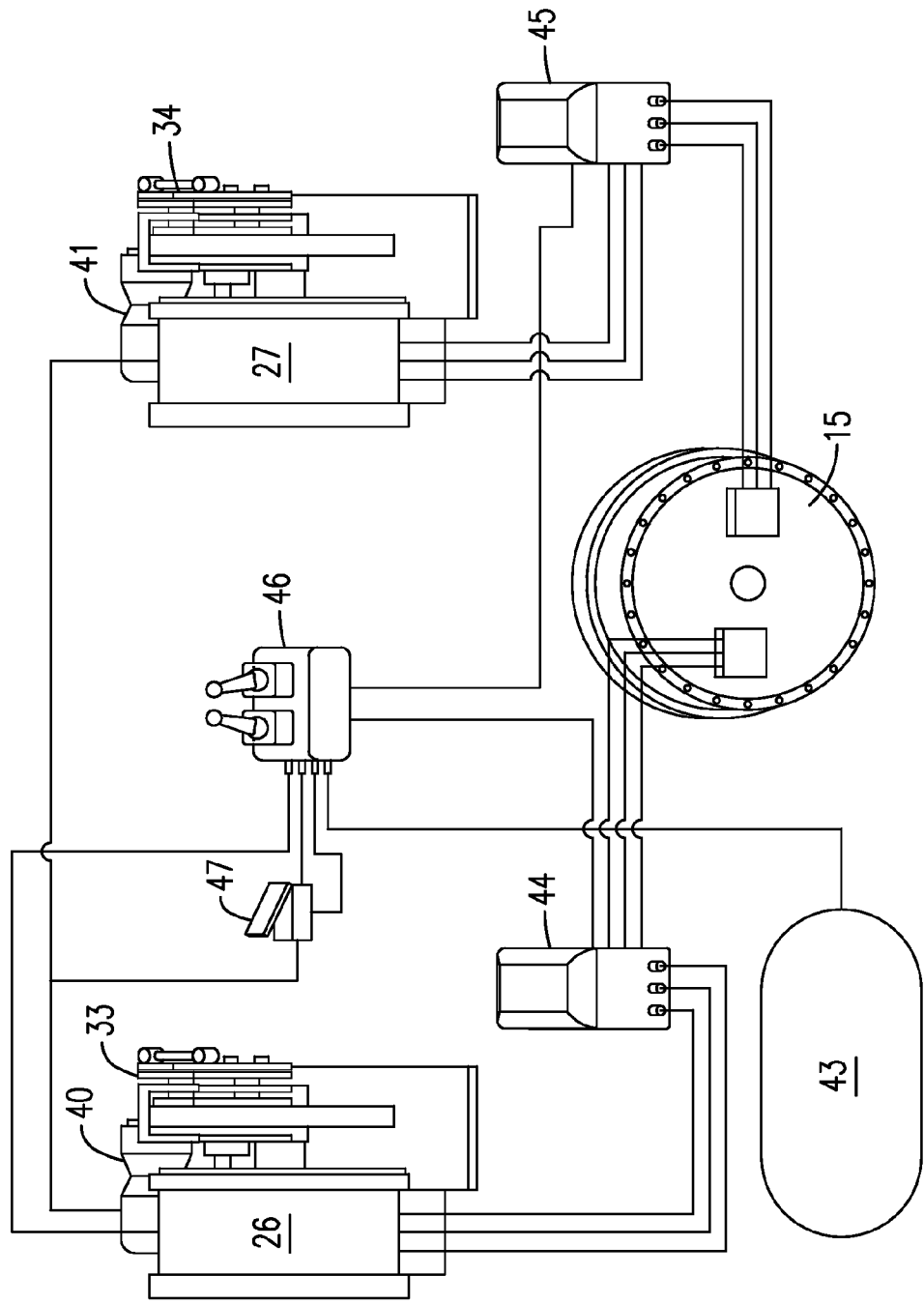
FIG. 4 is a control layout for the amphibious vehicle of FIGS. 1 through 3.

Drive shaft 28 is coupled through an air disc brake 33 while drive shaft 30 is coupled through disc brake 34, which air brakes are used in selectively braking the track assemblies 16 and 17 to brake the amphibious vehicle 10. The air brakes 33 and 34 are also used in steering the vehicle when making hard turns by braking one track while disengaging its coupled electric motor. The air brake 33 has a brake actuator 40 while the air brake 34 has a brake actuator 41. Actuators 40 and 41 are coupled to a compressed air tank 43 as seen in FIG. 4 which air is compressed by the air compressor 23. It will be clear that while air brakes are illustrated, hydraulic or any other type of brakes can be used within the spirit and scope of the invention.

Each drive shaft 28 and 30 is coupled to a track assembly 16 or 17 by a sprocket driving a chain 35 as seen in FIG. 2. In FIG. 2, hydraulic rams 36 can be seen driving a bell crank 37 and linkage 38 which raise the track assemblies 16 and 17 to a rest position when traveling on water and lowers the track assemblies to an operative position when traveling on land.

FIG. 4 illustrates the control system for the present amphibious vehicle. The control system controls the electric motor 26 with a motor controller 44 which connects electric power from the electric generator 15 through the controller 44 to the electric motor 26. The controller 44 is in turn controlled by the steering control 46 which may be operated by using a pair of control arms. The control system controls the electric motor 27 by a motor controller 45 which connects electric power from the electric generator 15 through the controller 45 to the electric motor 27. The controller 45 is in turn controlled by the steering control 46 which may be operated by a pair of control arms. The air brakes 33 and 34 are operated by the compressed air from the compressed air tank 43 which supplies compressed air to the steering control 46 and through a brake pedals 47. The brake pedal or pedals are used to supply compressed air to the brake actuators 40 and 41 which actuate the brakes 33 and 34.

In operation in water, the track assemblies 16 and 17 are in a raised position and the marine transmissions 20 and 22 are engaged to have the engines 11 and 12 drive the water jet drives 13 and 14 to propel the amphibious vehicle 10 across the water. On land, the track assemblies 16 and 17 are lowered to an operative position and the marine transmissions 20 and 22 disengage the water jet drives 13 and 14. The electric motors 26 and 27 are then operated to drive and steer the vehicle. The driving, steering, and braking of the vehicle on land is controlled by the control system of FIG. 4. Only one engine is used to power the generator 15 and the electric motors 26 and 27 when operating the vehicle on land. Both engines are used to drive the vehicle in water with the jet drives 13 and 14.

It should be clear at this time that an amphibious vehicle and amphibious vehicle drive system have been provided. However the present invention is not to be considered limited to the forms shown which are to be considered illustrative rather than restrictive.

I claim:

1. An amphibious vehicle comprising:
   a vehicle hull having a pair of track assemblies, each said track assembly being movable between a raised resting position and a lowered operative position;
   at least one internal combustion engine mounted in said vehicle hull coupled to a marine transmission driving a water jet drive attached to said vehicle hull for propelling said vehicle hull through water when both said track assemblies are in a raised resting position;
   an electric generator coupled to and driven by said at least one internal combustion engine;
   a pair of electric motors powered by said electric generator, one said electric motor coupled to each said track assembly for driving the track assembly to propel said vehicle hull on land when said track assemblies are in a lowered operative position;

a disk brake coupled to each said track assembly for selectively braking each said track assembly for braking and steering said vehicle hull; and an electric motor control for remotely controlling each said electric motor to selectively drive each track assembly for propelling and steering said vehicle hull;

whereby said amphibious vehicle is propelled in water by said water jet drive powered by said at least one internal combustion engine and propelled on land by said pair of track assemblies coupled to said electric motors and powered by said electric generator.

2. The amphibious vehicle in accordance with claim 1, wherein said at least one internal combustion engine comprises a pair of internal combustion engines each driving a water jet drive.

3. The amphibious vehicle in accordance with claim 2 in which each said internal combustion engine is a diesel engine.

4. The amphibious vehicle in accordance with claim 2, wherein a marine clutch is coupled to each said internal combustion engine and said water jet drive.

5. The amphibious vehicle in accordance with claim 2 in which each of said disc brake includes an actuator that is actuated by compressed air.

6. The amphibious vehicle in accordance with claim 5 having an air compressor driven by one of said internal combustion engines producing compressed air for operating said pair of disc brakes.

7. The amphibious vehicle in accordance with claim 6 having a compressed air storage tank coupled to said air compressor.

8. The amphibious vehicle in accordance with claim 7 having a control center having a compressed air line connected between said compressed air tank and each said disc brake actuator for selectively actuating each said disc brake.

9. The amphibious vehicle in accordance with claim 8 in which said control center is electrically coupled to said electric generator and to each said electric motor for controlling each said electric motor to thereby control each track assembly.

10. An amphibious vehicle comprising:
a vehicle hull having a pair of track drive assemblies, each said track drive assembly being movable between a raised rest position and a lowered operative position;
a pair of internal combustion engines mounted in said vehicle hull, each said internal combustion engine being coupled to a water jet drive attached to said vehicle;
an electric generator coupled to and driven by one of said pair of internal combustion engines;
a pair of electric motors powered by said electric generator, one said electric motor coupled to each said track assembly for driving the track assembly to propel said vehicle hull on land when said track assemblies are in a lowered operative position;
an air brake coupled to each said track assembly for selectively braking each said track assembly for braking and steering said vehicle hull;
a compressed air source operatively connected to each said air brake; and
an electric motor control for remotely controlling each said electric motor to selectively drive each track assembly for propelling and steering said vehicle hull;
whereby said amphibious vehicle is powered in water by said pair of internal combustion engines driving said pair of water jet drives and propelled on land by said pair of electric motors driving said track assemblies.

11. The amphibious vehicle in accordance with claim 10 in which said pair of internal combustion engines are diesel engines.

12. The amphibious vehicle in accordance with claim 11, wherein each diesel engine is coupled to one jet drive with a marine clutch to allow each diesel engine to run in idle when driving the vehicle on land.

13. The amphibious vehicle in accordance with claim 12 in which each said air brake includes a brake actuator for actuating said air brake.

14. The amphibious vehicle in accordance with claim 13 in which a compressed air line is connected between a compressed air tank and each air brake actuator for selectively actuating each said air brake.

* * * * *